United States Patent [19]
DePietro, III et al.

[11] Patent Number: 6,059,851
[45] Date of Patent: May 9, 2000

[54] AIR CLEANER; METHOD AND USE

[75] Inventors: Rocco A. DePietro, III, Eden Prairie; Steven A. Carter, Eagan; James K. Elfstrand, Mounds View, all of Minn.

[73] Assignee: Donaldson Company, Inc., Minneapolis, Minn.

[21] Appl. No.: 09/146,450

[22] Filed: Sep. 3, 1998

[51] Int. Cl.[7] .................................................. B01D 46/00
[52] U.S. Cl. ........................... 55/385.3; 55/327; 55/336; 55/498; 55/521; 55/529
[58] Field of Search .................. 55/327, 336, 385.1, 55/385.3, 498, 521, 529

[56] References Cited

U.S. PATENT DOCUMENTS

| | | | |
|---|---|---|---|
| 4,211,543 | 7/1980 | Tokar et al. | 55/521 |
| 5,102,436 | 4/1992 | Grabowski | 55/521 |
| 5,106,397 | 4/1992 | Jaroszczyk et al. | 55/521 |
| 5,522,909 | 6/1996 | Haggard | 55/521 |
| 5,549,724 | 8/1996 | Mochida | 55/521 |
| 5,730,766 | 3/1998 | Clements | 55/521 |
| 5,814,117 | 9/1998 | Mochida | 55/521 |
| 5,888,260 | 3/1999 | Sica | 55/529 |
| 5,916,435 | 6/1999 | Spearman et al. | 55/521 |

OTHER PUBLICATIONS

Declaration of Rocco A. DePietro III with Exhibits A–B.

Primary Examiner—David A. Simmons
Assistant Examiner—Minh-Chau T. Pham
Attorney, Agent, or Firm—Merchant & Gould P.C.

[57] ABSTRACT

An improved air cleaner arrangement is provided. The preferred air cleaner is wedge shaped, and is constructed as a "no-housing" arrangement. The arrangement includes first and second end caps, with pleated media extending therebetween. The preferred arrangement includes an angled mounting flange, for mounting beneath the hood of a vehicle.

20 Claims, 7 Drawing Sheets

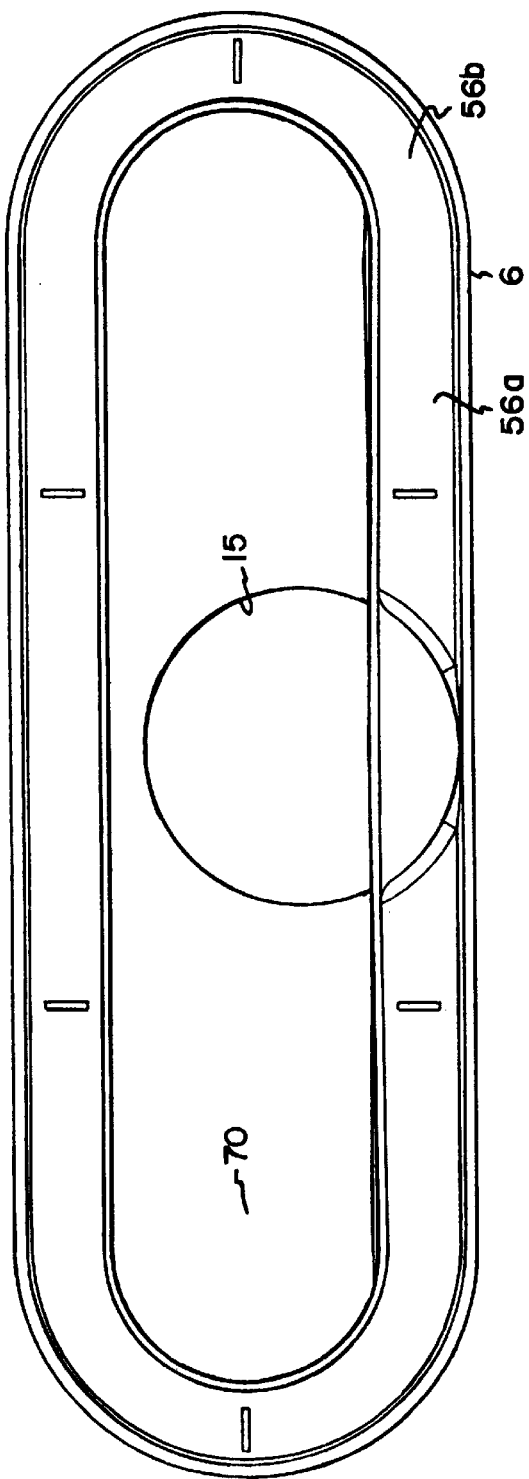
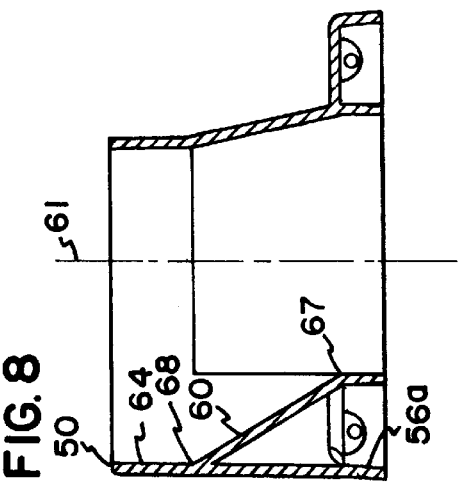
FIG. 6
FIG. 8

AIR CLEANER; METHOD AND USE

FIELD OF THE INVENTION

The present invention relates to air cleaners. The invention primarily concerns air cleaners for engine air intake systems, in which the air cleaner comprises a single unit with no exterior housing.

BACKGROUND OF THE INVENTION

In general, internal combustion engines require filtering of engine intake air, during operation. The filtering is conducted in order to remove undesirable levels of particulates carried within the air streams, before the air streams reach sensitive engine components.

A wide variety of air cleaner systems for use with internal combustion engines are known. One type of assembly, generally involves utilization of an exterior housing having a removable and replaceable filter element therein. A second type concerns a filter element provided with an appropriate mechanism to be attached directly to an engine air intake conduit, without being positioned within an air cleaner housing. This second type will sometimes referred to herein as a "no-housing" or "non-housing" air cleaner. The present application concerns the latter type of arrangement.

In general, improvements in such arrangements with respect to such features as filter life, filter efficiency, preferred air flow, and/or configuration for convenient mounting or positioning with respect to an engine, have been desired. Continual improvements are pursued, with the present invention relating to certain preferred configurations for certain selected systems.

SUMMARY

In one aspect, an air cleaner is provided. The air cleaner preferably comprises a no-housing construction including a media pack, a first closed end cap, and a second open end cap. In preferred embodiments, the media pack defines a wedge-shaped extension of media having an oval outer perimeter. The media pack preferably extends between the first and second end caps. In certain arrangements, the air cleaner is constructed and arranged to have an efficiency of at least 96%, according to SAE J726 automotive test. In certain arrangements, the air cleaner is constructed and arranged to have a flow characteristic of at least 940 cfm according to SAE J726.

In certain preferred arrangements, the first end cap will have a length to width ratio of at least 3. In some preferred embodiments, the second end cap will have a length to width ratio of at least 2.

In preferred embodiments, the first closed end cap will include a mounting flange thereon, preferably angled.

Another aspect of the disclosure provides an engine air flow system. The engine air flow system comprises preferably an engine having a piston displacement of at least 5.0 liters. An air filter element is constructed and arranged to filter engine intake air into the engine. In certain aspects, a preferred air filter element comprises a first closed end cap and a second open end cap with a wedge-shaped region of filtering media extending therebetween. Preferred systems will include a mounting structure on the end cap for mounting to a frame to operably position the air filter element upstream from the engine. Preferred systems will include the region of filtering media having an oval outer perimeter. Preferably, the region of filtering media comprises a single layer of oiled pleated polyester fibrous media, having at least 50 pleats. Preferably, the media will weigh 1.4–1.7 ounces per square yard and have a free state thickness of 0.19–0.23 inches.

BRIEF DESCRIPTION OF THE DRAWINGS

FIG. 6 is a bottom plan view of the end cap shown in FIG. 5;

FIG. 7 is a side elevational view of the end cap shown in FIG. 5;

FIG. 8 is a cross-sectional view taken generally along line 8—8, FIG. 5; and

DETAILED DESCRIPTION

The present invention generally concerns air cleaner arrangements. The particular air cleaner arrangement specifically described herein, was developed to be preferred for utilization with certain types of motor vehicles, although it can be applied in a wide variety of applications. The particular types of motor vehicles for which the arrangement was designed, are high performance "sports" automobiles. A particular automobile for which the arrangement was designed, and for which the preferred embodiment depicted is appropriate, is the year C5 model Corvette automobile, LS1 (years 97, 98, 99) engine, 350 cubic inch (5.7 liter) manufactured by General Motors Corporation. Of course, the principles described herein can be used to provide air cleaner arrangements for a variety of vehicles; however they are particularly well adapted for large automotive engines (300 cu. inch or larger; i.e. 4.9 liter or larger).

Typically, high powered performance sports automobiles generally have relatively limited space under the hood (hood space) in which to position air cleaner arrangements. It is necessary and preferred to develop air cleaner designs that can fit readily within the hood space, yet still offer an appropriate level of performance. The particular arrangement described herein is a preferred configuration for utilization in the hood space available in the C5 Corvette automobile. It can, however, be adapted to fit a variety of other situations.

Figure 1:
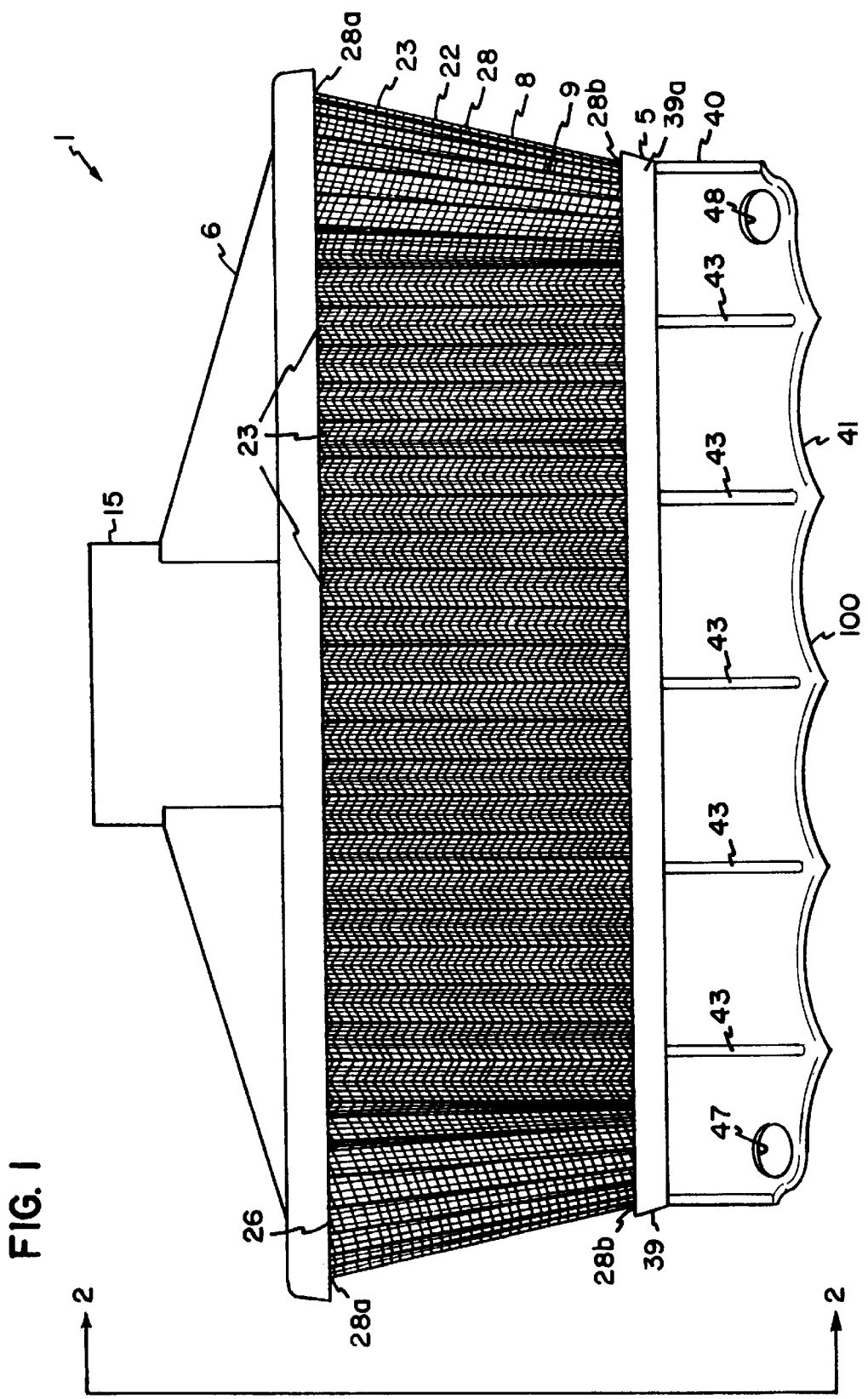
FIG. 1 is a side elevational view of an air cleaner assembly according to the present invention.

The reference no. 1, FIG. 1, generally designates an air cleaner assembly according to the present invention. The air cleaner assembly 1 generally comprises 3 units, assembled together in a nonmoving, permanently assembled, fashion. The 3 units comprise: a first, closed, end cap 5; a second, open, end cap 6; and, a media pack 8. The media pack 8 extends between the end caps 5, 6.

The air cleaner assembly 1, for preferred applications, will be configured for operation in a "forward flow" manner. This means that, during operation, air to be filtered is generally directed against an exterior surface 9 of the media pack 8. The air passes through the media pack 8, to an interior volume 12, FIG. 3, which is surrounded by the media pack 8. The interior volume 12 comprises a clean air plenum, on the downstream side 13 of the media pack 8. The air can then pass outwardly through outlet tube 15. In normal use, a flexible hose or similar construction will be connected to outlet tube 15, for example through use of the hose clamp. The flexible tube or other conduit would then be directed appropriately to provide air flow to downstream engine components.

The air cleaner arrangement 1 depicted in FIG. 1, is a "non-housing" or "no-housing" arrangement. That is, the unit or arrangement 1, as shown, is simply installed under the hood of the vehicle. There is no separate or separable housing for the filter element 1. In some arrangements, when the arrangement 1 has reached the end of its useful life, it is replaced in its entirety. In other arrangements, the arrangement 1 is re-used by cleaning and re-oiling.

A variety of arrangements can be utilized for the media pack 8. Specific preferred arrangements are described hereinbelow. In general, for certain preferred applications, the media pack 8 will comprise a pleated media pack 22, organized in a wedge configuration, to circumscribe interior volume 12. Thus, the pleated media pack 22 comprises a plurality of media pleats 23, with each pleat extending between end caps 5 and 6.

Preferably the pleated media pack 22 is secured to end caps 5 and 6, by a potting material or adhesive, for example thixotropic polyurethane rigid. That is, for the preferred arrangement, end caps 5 and 6 are "preformed", meaning that the end caps are formed prior to the securement of the pleated media thereto. Preferably the end caps 5, 6 each comprise molded plastic, having relatively rigid or hard construction. The end caps 5, 6 then serve as receptacles for volumes of uncured adhesive, in which the ends of pleated media are potted, during construction of arrangement 1. Herein, end caps that are formed prior to assembly of the air cleaner arrangement, i.e. prior to a potting operation, will be referred to as "preformed" end caps.

Figure 2:
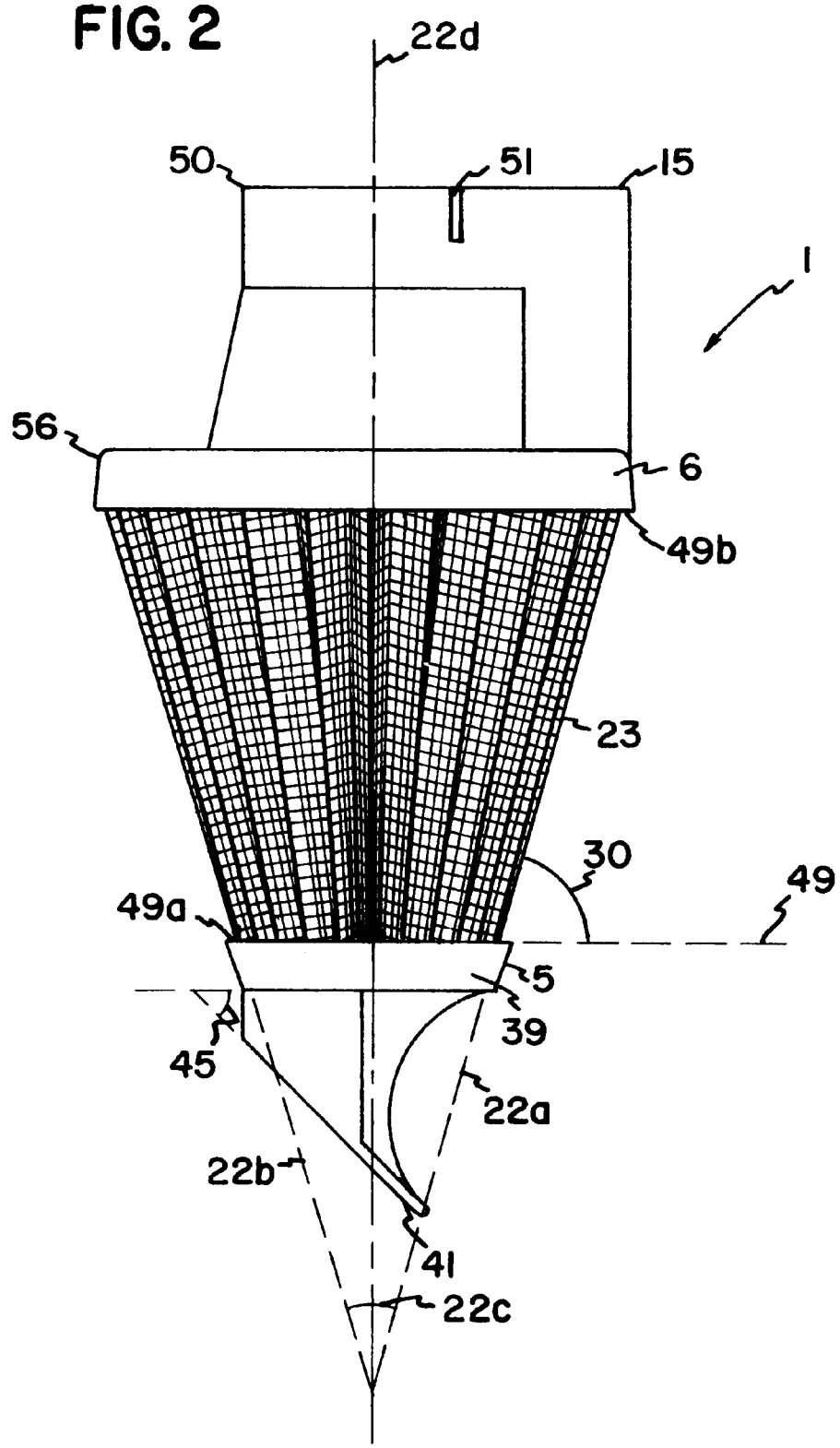
FIG. 2 is an end elevational view of the air cleaner arrangement of FIG. 1, taken generally from the position of line 2—2, FIG. 1.

As indicated above, generally the media is wedge shaped. That is viewing the media from a side elevational view shown in FIG. 2, opposite planes defined by sides (or outer pleat tips) of the media extension, indicated generally at 22a and 22b, extend at an angle relative to one another. The pleat tips are approximately co-planer; that is, in actual use, the pleat tips may vary slightly from a single, continuous plane. For the purposes of clarity, the pleat tips shown in FIG. 2 are shown in the same plane. Generally the angle, defined as the angle at the intersection of the two side planes of the media, and reflected generally at 22c, will be referred to herein as the "wedge angle". For typical arrangements according to the present invention, the wedge angle will be an angle between about 20° and 40°, typically between 25° and 35°, preferably about 30–33°. In preferred constructions, the wedge is symmetrical. That is, wedge angle 22c is approximately bisected by a center plane 22d bisecting both end caps 5, 6, FIG. 2.

Figure 3:
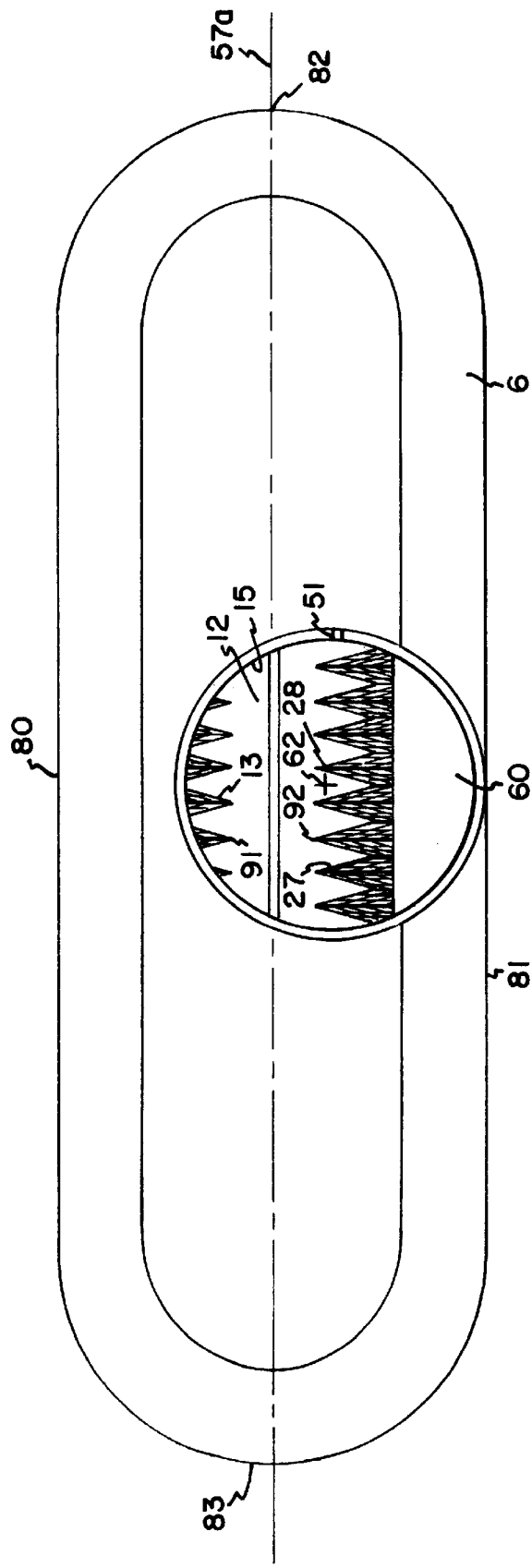
FIG. 3 is a top plan view of the arrangement shown in FIG. 1.

The preferred media pack 22, for use in air cleaner assemblies 1 according to the present invention, comprises a 3-part structure including: an outer liner 26, FIG. 1; an inner liner 27, FIG. 3; and, a region of filter media 28, having opposite ends 28a and 28b, positioned therebetween. Preferably, the inner liner 27 and outer liner 26 each comprise woven wire mesh structure which is relatively rigid and self-supporting. That is, preferably the wire mesh structure is also pleated, and serves to support and retain the more flexible media in the preferred pleated configuration. A preferred material for utilization as the woven wire mesh is epoxy coated aluminum wire 18 by 16 squares/inches, 0.011" thickness.

The filter media 28, positioned between the inner and outer liners 27, 26, can comprise a variety of materials. A preferred material, for use with arrangements according to the present invention, is a fibrous polyester material, preferably a single layer of fibrous polyester material. Most preferably the media material is a polyester fiber material treated with oil, to increase efficiency. Specifications for preferred media are provided below.

Figure 4:
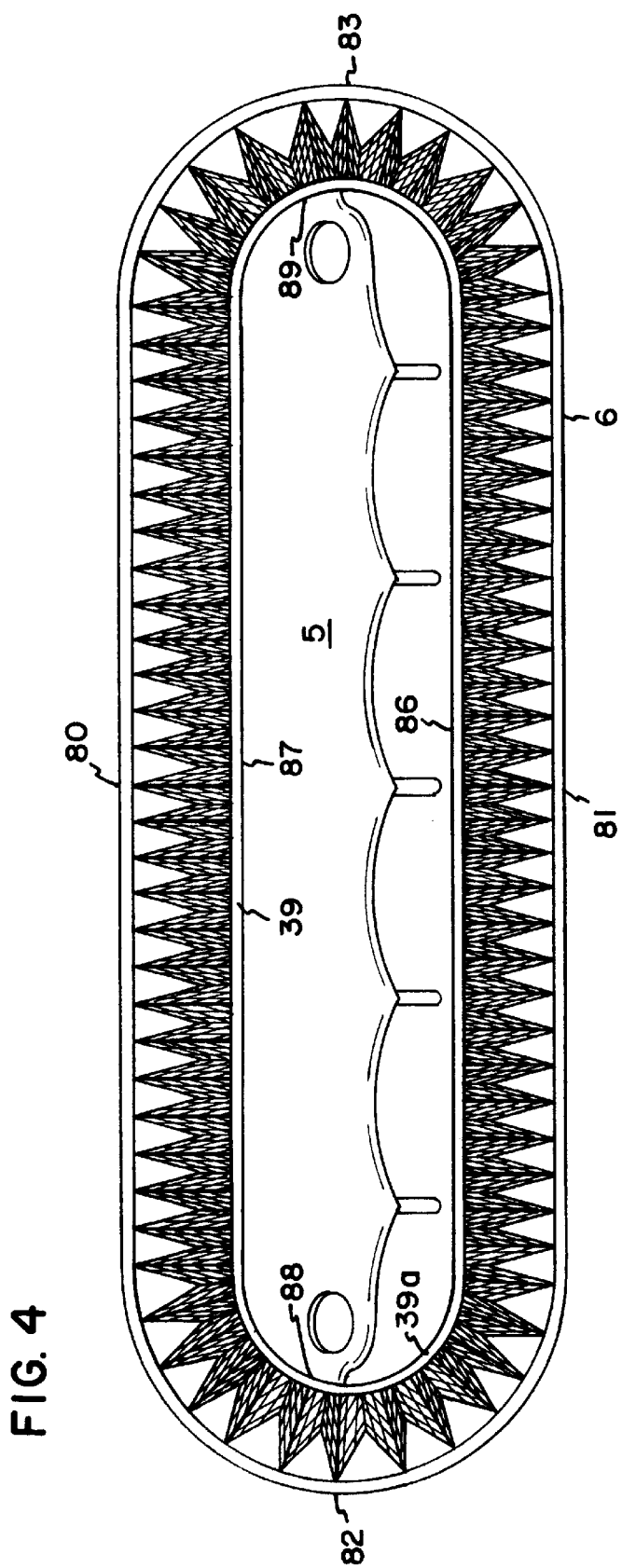
FIG. 4 is a bottom plan view of the arrangement shown in FIG. 1.

Preferably, the media is provided in a "continuous" construction, with a longitudinal media seam, whereat the media are joined to one another at opposite ends to form an oval perimeter (FIG. 4), provided by a metal clip.

Preferably, the pleat depth for the pleats is at least ½ inch (1.25 cm), and not greater than about 1 inch (2.5 cm). Most preferably, it is about ⅞ inch (2.22 cm). In this manner, high media volume and surface area, with avoidance of undesirable dead space, is achieved. Most preferably, the pleat density is within the range of about 2 to 5 pleats (preferably 2.5–3.5 pleats) per inch (per 2.5 cm), when measured along the second end cap 6, around the exterior perimeter. When measured around the interior perimeter of the second end cap, the pleat density is about 3 to 4 pleats per inch.

Most preferably, the arrangement is sized and configured to have at least 75 pleats, preferably it has at least 80 pleats, and most preferably about 90 to 95 pleats.

As can be seen from FIG. 2, preferably the opposite rows or planes 22a, 22b of pleats 23 are potted to extend at an oblique angle, between end caps 6 and 5. The preferred oblique angle, defined at 30, FIG. 2, is within the range of about 70° to 80°, preferably about 71° to 77° most preferably about 75° nand not more than 85°. This angle of extension 30 of the pleats 23 will be generally referred to herein as the external side pleat angle.

It is noted that the corresponding side pleat angle along the inside surface (internal side pleat angle) would generally be the compliment to external pleat angle 30.

Referring again to FIGS. 1 and 2, the first end cap 5 includes a potting rim 39 thereon. The potting rim 39 defines the perimeter wall of the central trough or recess 39a into which pleat ends 28b can be potted. Preferably the perimeter wall 39 defines a receiving trough or tray or recess 39a for the pleat ends 28b, which is at least about 4 mm deep, typically 5 mm to 15 mm deep.

Still referring to FIGS. 1 and 2, the first end cap 5 also includes a mounting extension 40 thereon. The mounting extension 40 includes mounting surface or flange 41 supported by braces 43. The mounting flange 41 defines first and second mounting apertures 47 and 48 therein. Referring to FIG. 2, flange 41 preferably extends in an acute angle, defined at 45 within the range of about 30° to 60°, preferably about 40° to 50°, most preferably about 45° relative to a line such as line 49, which is parallel to surfaces 49a and 49b of end caps 5 and 6, respectively. Angle 45 will generally be referred to herein as the "mounting angle" of the flange 41. The mounting angle 45, of course, will typically be selected for the particular vehicle hood space and engine configuration of the vehicle for which the assembly 1 is intended.

In general, the air cleaner assembly 1 will be mounted under the hood and to the framework of a vehicle, by securing flange 41 against a portion of the vehicle frame or framework. Mounting is accomplished through bolts (not shown) extending through apertures 47 and 48. When so mounted, braces 43 will help support the remainder of the air cleaner assembly 1 projecting at the selected mounting angle, with appropriate resistance to material failure, during use.

Preferably end cap 5 is a single, preformed, injection-molded unitary piece, molded from a relatively hard, rigid durable plastic such as polymamide thermoplastic. This will facilitate assembly and installation.

Attention is now directed to the open end cap 6, FIG. 2. As indicated above, the open end cap 6 defines an outlet tube 15, for filtered air to escape through the air cleaner assembly 1. The outlet tube 15 preferably has a circular open end 50 for easy attachment for a hose clamp, etc. The end 50 may include a plurality of slits 51, therein, to facilitate mounting of a hose, during use of a hose clamp.

Similar to end cap 5, preferably end cap 6 is a single, preformed, injection-molded unitary piece, molded from a relatively hard, rigid, durable plastic such as polyamide thermoplastic.

Similar to end cap 5, end cap 6 includes an outer wall or rim 56 defining an interior receiving trough 56a (FIG. 6) for potting of the media pack 8. Preferably, the rim 56 defines a trough 56a at least 5 mm deep, most preferably 5 mm to 20 mm deep. Perimeter 56 generally defines an oval or racetrack shape, FIG. 3, as does perimeter 39, FIG. 4. Preferably end cap 6 includes a perimeter gutter 56b, FIG. 6 therein, to control flow of adhesive during assembly.

It is noted that for the preferred arrangement shown, the outlet tube 15 is eccentrically positioned, with respect to longitudinal center line 57a of the end cap 6. This is shown, for example, in FIG. 3.

More specifically, in preferred embodiments, the center 62 of circular outlet tube 15 is spaced from of longitudinal center line 57a by distance of at least 15 mm, typically within the range of 18 to 22 mm along a line perpendicular to center line 57a. This eccentric positioning of outlet tube 15 facilitates desirable mounting, positioning and desirable air flow properties. It is noted that the center of outlet tube 15 is preferably centrally positioned longitudinally, i.e., between ends 82 and 83, FIG. 3.

Referring to FIG. 3, preferably outlet tube 15 includes an inner ramp 60. The inner ramp 60 is preferably a flat, rather than curved, extension as illustrated in the cross section, FIG. 8. The ramp is preferably positioned along a side of tube 15 located adjacent a side edge 81 of end cap 6, i.e., the side edge toward which tube 15 is eccentrically positioned. The ramp 60 will help with respect to obtaining desirable air flow through the arrangement. The ramp 60 preferably extends at an angle of about 20 to 40°, most preferably about 25 to 30°, with respect to axis 61, FIG. 8. The ramp 60 preferably stops short of end 50, FIG. 8, leaving a circular extension 64 extending over an axial direction of at least 19 mm, typically about 20 to 30 mm; and, to provide a length of extension of ramp 60, between points 67 and 68, FIG. 8, of preferably about 45 to 65 mm, most preferably about 55 mm. Generally, ramp 60 will have an elliptical planar perimeter configuration to form a parabolic conic section, in preferred constructions.

Figure 5:
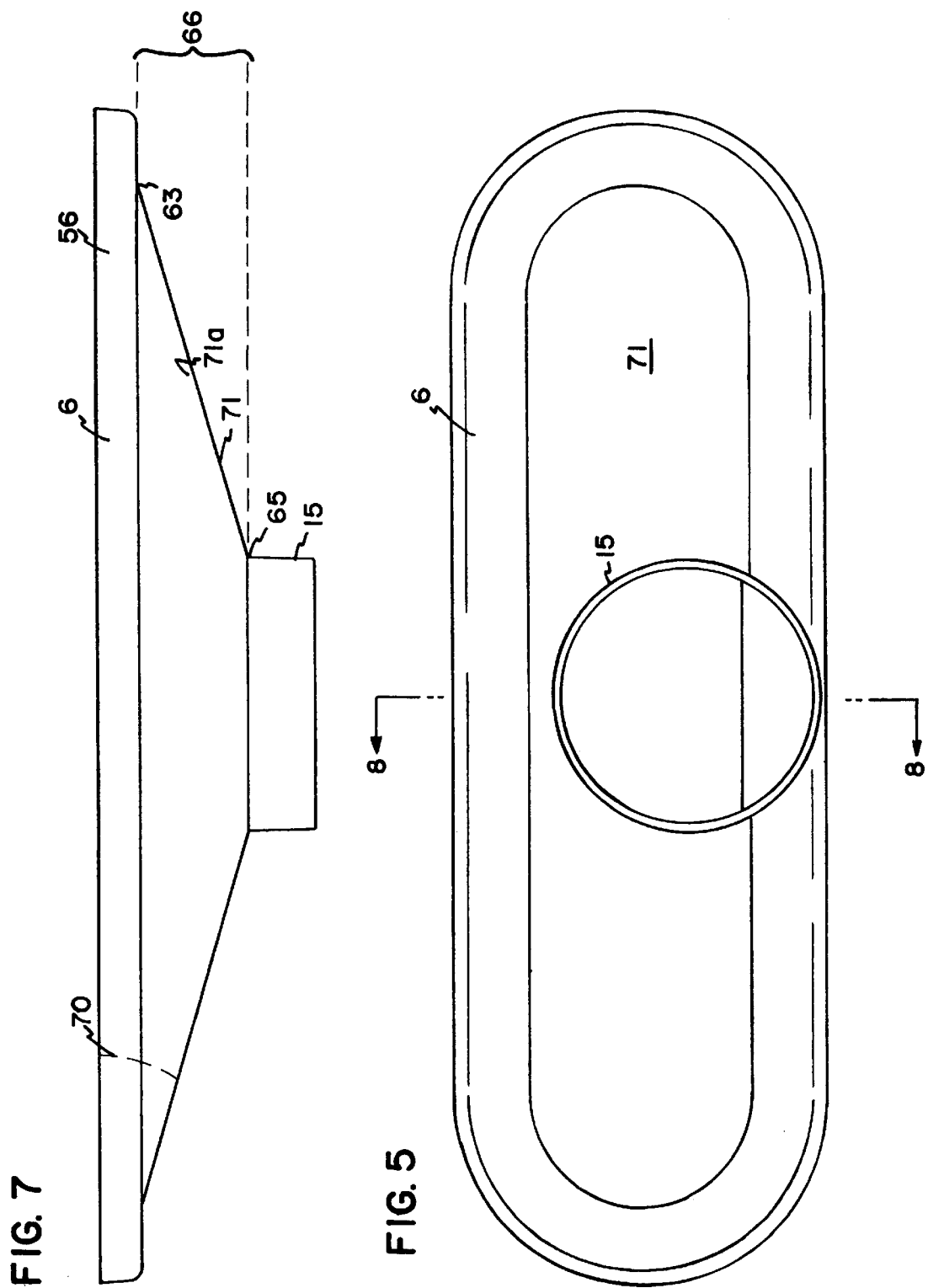
FIG. 5 is a top plan view of an end cap portion of the arrangement shown in FIG. 1.

Attention is now directed to FIGS. 5–7, in which end cap 6 is shown in detail. The end cap 6 includes a center recess 70 (FIG. 6) defined by outer surface 71 (FIG. 7). The result is a generally oval (perimeter) shaped inner funnel surface 71a (FIG. 7) directed toward outlet tube 15. Such an inside surface contour facilitates air flow along the interior 70 of the end cap 6, during operation.

In FIG. 7, inside contour funnel surface 71a generally slants through a vertical dimension 66, i.e. the dimension indicated between point 63, the point adjacent to rim 56, and point 65, the point adjacent to the outlet tube 15, at least 20 mm, preferably within the range of 30 to 100 mm. This slant will sometimes be referred to as the "vertical drop". Preferably, the inside 71a is provided with rounded contouring rather than harsh or sharp edges or corners. Most preferably the funneling is a gradual slope on the order of about 12 to 35 degrees, preferably about 15–20°, between each one of the longitudinal ends, indicated at 63 and 65, FIG. 7, and the center tube 15.

The geometric configuration for the preferred air cleaner arrangement 1, especially for use with the C5 Corvette, or similar vehicles, is one in which the outer perimeters of the end caps 5, 6 each include: first and second opposite, parallel, sides of the same length, and oriented aligned with one another, as opposite sides of a rectangle; and with first and second opposite ends each rounded to a circular radius. A specific example is described below. Referring to FIG. 3, for end cap 6, this comprises first and second opposite sides 80 and 81, with first and second opposite curved end sections 82 and 83. For end cap 6, FIG. 4, this would be first and second opposite sides 86 and 87, and first and second opposite curved end sections 88 and 89. Some specific preferred dimensions and relative dimensions are provided in the section hereinbelow.

In general, herein when reference is made to a "perimeter area", what is meant is the size of the area defined by the outside perimeter line of the item. Herein when reference is made to a "length" of an end cap, reference is meant to the longest dimension of the end cap. For the preferred end cap 6 shown in FIG. 3, this would be the distance between points 82 and 83. Herein, when reference is meant to a "width" of an end cap, reference is meant to its narrowest cross-sectional dimension. For end cap 6, FIG. 3, this would be the distance between parallel walls 80 and 81.

Herein when reference is made to the "spacing" between end caps, in planar projection, what is meant is the distance the end caps are spaced from one another, disregarding the "pleat angle". This would be the projected distance between planes defined by the outer rims.

Herein when reference is made to a length of extension of the pleats, the term is meant to refer to the total length of the pleats, including portions potted.

In general, for arrangements usable with the C5 Corvette, or similar vehicles, the following preferred configurations will be useful:

1. For the perimeter end cap 6, an overall outer perimeter area of at least 450 cm$^2$, typically about 500 cm$^2$ to 570 cm$^2$.
2. A length to width ratio for the perimeter of rim 56 of end cap 6 of at least 2, typically within the range of 2.5 to 3.5.
3. A length to width ratio for the perimeter rim 39 of end cap 5 of at least 3, typically within the range of 4.5 to 5.5.
4. A spacing between end caps 5 and 6, in planar projection, of at least 10 cm, typically about 11 cm to 13 cm (preferably about 12 cm).
5. An external pleat angle for the pleats preferably of no more than 80°, typically 71° to 77° (most preferably about 75°).
6. A length of extension of the pleats 23 of at least 12 cm, typically 13 cm to 15 cm.
7. A spacing of along the interior 12 between opposed ends of opposite rows of pleat tips, FIG. 3, of no more than 40 mm, typically 20 to 30 mm. In FIG. 3 this spacing is represented by the distance between tips 91 and 92.

8. A spacing along the interior between opposed ends of opposite rows of the pleat tips adjacent to potting in end cap 6, of at least 80 mm, typically 82 to 90 mm.
9. A total number of pleats at least 75 pleats, typically 90 to 95.
10. A pleat spacing of at least 2 pleats per 2.5 cm along an outer perimeter of end cap 6, typically 2.5 to 3.5 pleats per 2.5 cm.
11. A ratio of straight portion of an end cap side, for end cap 6, to overall length of end cap (longitudinal dimension), for end cap 6, of at least 0.60, typically 0.65 to 0.80, preferably at least about 0.67.

Media Specifications

As indicated above, the preferred media is a fibrous polyester depth media. Such media are commercially available from fiber companies such as Fiberbond Corp. of Michigan City, Ind.

Preferred media will have a basis weight of about 1.4–1.7 oz/yd$^2$ (48–58 g./m$^2$) and a thickness, at 0.002 psi compression of about 0.19–0.23 in. (4.8–5.8 mm.); and, a thickness, at 0.3 psi compression, of about 0.066–0.081 in. (1.68–2.06 mm.). The preferred material has a permeability of at least 800 feet per minute, preferably at least about 869 feet per minute at 0.5 inch H$_2$O (i.e. at least 265 m./min. at 50 in. H$_2$O) minimum.

Preferably a flame retardant material is utilized.

A preferred media is one having polyester fibers of an average fiber diameter of at least 8 microns and not more than 22 microns. Typical useful materials include ones having an average fiber diameter within the range of 10–14 microns. Media comprising mixtures of fibers can be used. Typical preferred materials will also be ones having a free state solidity of less than 1.5%, typically 0.5–1.0%.

Most preferably the media is one which has been oiled prior to mounting within the assembly. By oiled it is meant that it is impregnated with oil, 50% by weight.

A Preferred Construction for Utilization with the C5 Corvette

In this section, a preferred construction for utilization with the C5 Corvette is described in detail. The particular configuration in construction described is preferable for the C5 Corvette, which has a 350 cubic inch (5.7 liter) engine. The construction is one such that the arrangement has an efficiency when evaluated according to SAE J726 (June '93) under the automotive air cleaner test procedure, of at least 96 percent, preferably at least 97 percent and most preferably about 98 percent or greater.

The construction described is one which has a preferred air flow characteristic, when evaluated according to SAE J726, June 1993. Most preferably the flow characteristic is such that under the SAE J726, June 1993 evaluation, at 28 inches of water pressure drop, the measured air flow is at least 940 scfm (standard cubic feet per minute), preferably at least 950 scfm and most preferably about 960 scfm or greater.

The preferred construction has an overall media surface area of at least 4.5 square feet. preferably at least 5.5 square feet most preferably about 6 square feet, or more.

The plastic end caps for the overall construction preferably comprise injection molded to have an overall average wall thickness of about 2 to 4 mm., typically about 3 mm.

The end cap 5 preferably has a distance between center points of the bolt holes 47, 48 of at least 200 mm, preferably greater than 300 mm, and more preferably between 320–330 mm. The end cap 5 preferably has an overall length between end 88 and end 89 of at least 300 mm, preferably at least 350 mm, and more preferably 360–400 mm. Preferably, the length of the flange 41 is at least 30 mm, preferably greater than 50 mm, and more preferably 60–80 mm. Preferably, the width of the end cap 5 between points 86 and 87 is less than 100 mm, preferably less than 90 mm, and preferably 50–85 mm.

End cap 6 preferably has a overall length between ends 82 and 83 of greater than 350 mm, preferably at least 400 mm, and more preferably 420–450 mm. Preferably, the end cap 6 has a width between sides 80 and 81 of less than 150 mm, and preferably about 130–140 mm. Preferably, the width of the receiving trough 56a is at least 20 mm, preferably greater than 22 mm, and more preferably between 23 and 30 mm. Preferably, the outlet tube 15 has a diameter of at least 90 mm and preferably 92–100 mm.

It is noted the certain features of the arrangement depicted, are provided to lend, to the arrangement, an overall distinctive, ornamental, appearance. For example, the "scalloped" edge 100, FIG. 1 of the mounting flange 41, provides for distinctive ornamental appearance, and will serve to indicate that the product is made under the auspices of Donaldson Company, Inc., Bloomington, Minn. In addition, it is anticipated that some arrangements of the media may be colored a distinctive "blue" color, also in order to signify the Donaldson source, especially in contrast to a distinctive black color for the end cap 5, 6. Finally, the product is shown with a "stipple" or "roughened" exterior surface in portions of the end caps 5, 6, in order to enhance ornamental appearance and distinctiveness. The depicted air cleaner arrangement 1 is the subject of a simultaneously filed U.S. design patent application.

Systems

Figure 9:
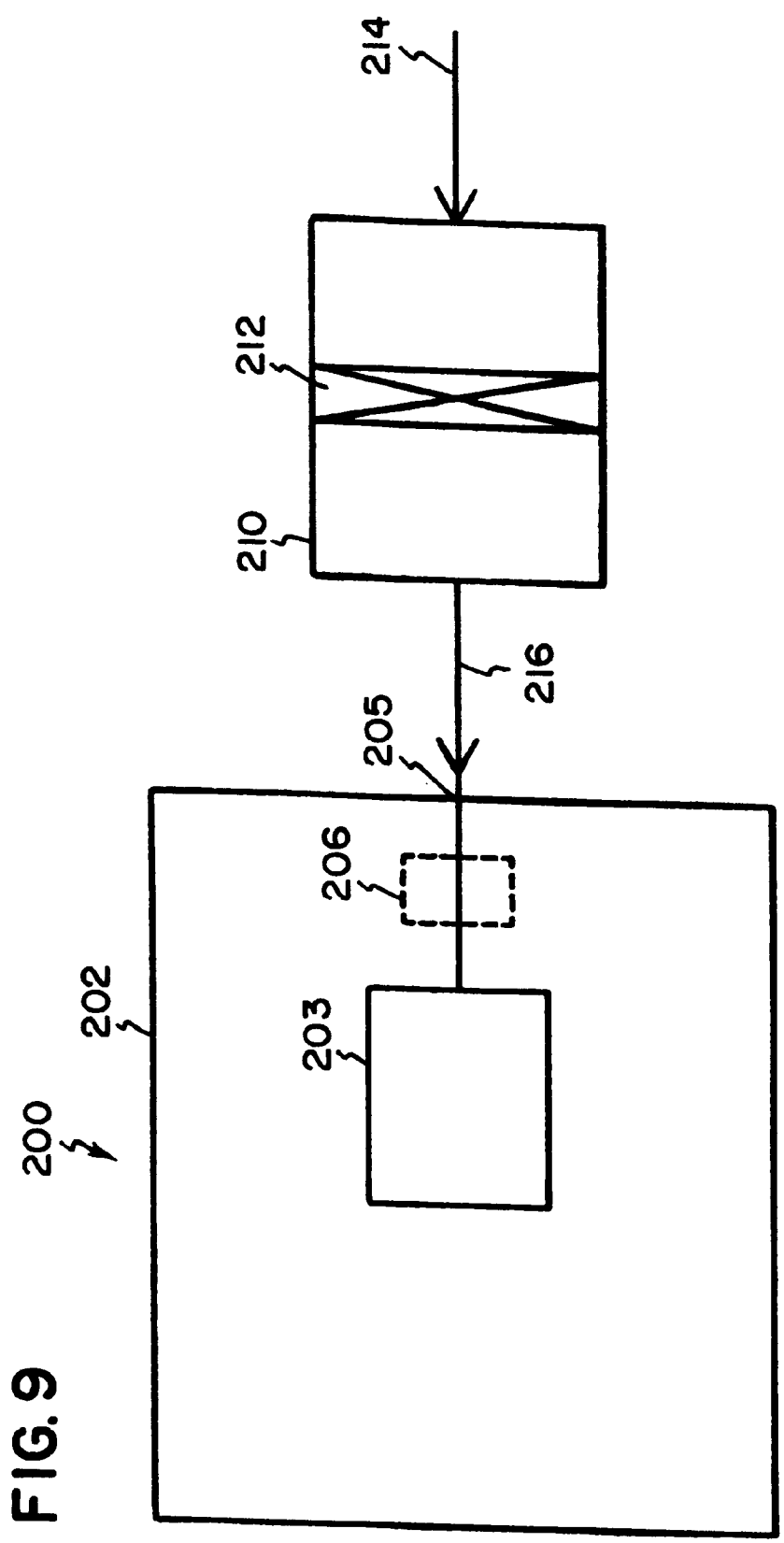
FIG. 9 is a schematic view of a system having an engine with an air intake system and an air cleaner therein.

In FIG. 9, a schematic view of a system is shown generally at 200. System 200 is one type of system in which air cleaner arrangements and constructions described herein is usable. In FIG. 9, equipment 202, such as a vehicle, having an engine 203 with some defined rated air flow demand is shown schematically. Equipment 202 may comprise a high performance automobile, such as a Corvette. Engine 203 powers equipment 202, through use of an air/fuel mixture. In FIG. 9, air flow is shown drawn into engine 203 at an intake region 205. An optional turbo 206 or supercharger or compressor is shown in phantom, as optionally boosting the air intake into the engine 203. An air cleaner 210 having a media pack 212 is upstream of the engine 203 and turbo 206. In general, in operation, air is drawn in at arrow 214 into the air cleaner 210 and through media pack 212. There, particles and contaminants are removed from the air. The cleaned air flows downstream at arrow 216 into the intake 205. From there, the air flows into engine 203, to power vehicle 202.

We claim:

1. A no-housing air filter comprising:
 (a) a first molded end cap, said first end cap being a closed end cap and having:
  (i) a mounting flange extending at a mounting angle within the range of 30 to 60° from a base of said first end cap;
  (ii) a first length and a first width; and
  (iii) a length to width ratio of at least 3;

(b) a second molded end cap, said second end cap being an open end cap and having:
  (i) an eccentrically disposed circular outlet allowing filtered air to exit from a center of the air filter;
  (ii) a second length and a second width; the second length greater than the first length and the second width greater than the first width; and
  (iii) a length to width ratio of at least 2; and
(c) a pleated media pack comprising at least 50 pleats, extending from said first end cap and said second end cap, said media pack having a first oval outer perimeter proximate the first end cap and a second oval outer perimeter proximate the second end cap, wherein the second oval outer perimeter is greater than the first oval outer perimeter.

2. A no-housing air filter according to claim 1 wherein said media pack comprises an oiled, fibrous, construction.

3. A no-housing air filter according to claim 1 wherein said media pack comprises a single layer of fibrous media positioned between inner and outer layers.

4. A no-housing air filter according to claim 3, wherein said inner and outer layers are woven wire mesh structures.

5. A no-housing air filter according to claim 1 wherein said media pack comprises at least 75 pleats.

6. A no-housing air filter according to claim 5 wherein said media pack has an interior pleat tip spacing, between opposite rows of pleats, adjacent said first end cap of no greater than about 40 mm.

7. A no-housing air filter according to claim 6 wherein said media pack has an interior pleat tip spacing, between opposite rows of pleats, adjacent said second end cap of at least 80 mm.

8. A no-housing air filter according to claim 1 wherein said media pack is wedge shaped and comprises a symmetric wedge having a wedge angle within the range of 20 to 40°.

9. A no-housing air filter according to claim 1 wherein said media pack is potted within said first end cap and within said second end cap by an adhesive.

10. A no-housing air filter according to claim 1 wherein said circular outlet includes a flat air flow ramp positioned therein.

11. A no-housing air filter according to claim 1 wherein said second end cap includes an inner surface defining an outwardly sloped, funneled surface sloping over a vertical distance at least 20 mm before reaching said outlet.

12. A no-housing air filter according to claim 11 wherein said funneled surface defines said first oval outer perimeter and said second oval outer perimeter.

13. An engine air flow system comprising:
(a) an engine having a piston displacement of at least 5.0 liters;
(b) a no-housing air filter element constructed and arranged to filter engine intake air to the engine; said air filter element comprising:
  (i) a first, closed end cap including a mounting structure for mounting said air filter element to a frame to operably position said air filter element upstream from said engine, said first end cap having an oval shape with a length to width ratio of at least 3;
  (ii) a second, open end cap; said second end cap defining a circular outlet opening disposed eccentrically in said second end cap for airflow therethrough, said second end cap having an oval shape with a length to width ratio of at least 2; and
  (iii) a wedge shaped region of filtering media having an oval outer perimeter; said region of filtering media having first and second opposite ends extending between said first and second end caps;
    (A) said region of filtering media comprising a single layer of oiled pleated polyester fibrous media, having at least 50 pleats, said media weighing 1.4–1.7 oz/yd$^2$ and having a free state thickness of 0.19–0.23 inches.

14. An engine air flow system according to claim 13 wherein said pleated polyester fibrous media has at least 75 pleats.

15. An engine air flow system according to claim 13 wherein said pleated polyester fibrous media is disposed between inner and outer layers.

16. An engine air flow system according to claim 15 wherein said inner and outer layers are woven wire mesh structures.

17. An engine air flow system according to claim 13 wherein said wedge shaped region comprises a symmetric wedge having a wedge angle within the range of 20 to 40°.

18. An engine air flow system according to claim 13 wherein said circular outlet in said second end cap includes a flat air flow ramp positioned therein.

19. An engine air flow system according to claim 13 wherein said mounting structure extends from said first end cap at a mounting angle within the range of 13 to 60°.

20. An engine air flow system according to claim 13 wherein said engine is an engine for a General Motors Corvette.

* * * * *

UNITED STATES PATENT AND TRADEMARK OFFICE
CERTIFICATE OF CORRECTION

PATENT NO. : 6,059,851  
DATED : May 9, 2000  
INVENTOR(S) : Depietro, III et al.

Page 1 of 1

It is certified that error appears in the above-identified patent and that said Letters Patent is hereby corrected as shown below:

Column 4,  
Line 34, "nand" should read -- and --

Column 5,  
Line 6, "polymamide" should read -- polyamide --  
Line 32, delete "of" after the word -- from --

Column 7,  
Line 46, delete "in construction" after the word "configuration"  
Line 64, "feet most preferably" should read -- feet, most preferably --  
Line 66, "comprise" should read -- are --

Column 9, claim 12,  
Lines 47 and 48, delete "said first oval outer perimeter and"

Signed and Sealed this

Thirteenth Day of November, 2001

Attest:

NICHOLAS P. GODICI  
Attesting Officer   Acting Director of the United States Patent and Trademark Office